US008824693B2

(12) United States Patent
Åhgren

(10) Patent No.: US 8,824,693 B2
(45) Date of Patent: Sep. 2, 2014

(54) PROCESSING AUDIO SIGNALS

(75) Inventor: Per Åhgren, Stockholm (SE)

(73) Assignee: Skype, Dublin (IE)

( * ) Notice: Subject to any disclaimer, the term of this patent is extended or adjusted under 35 U.S.C. 154(b) by 165 days.

(21) Appl. No.: 13/307,994

(22) Filed: Nov. 30, 2011

(65) Prior Publication Data

US 2013/0083934 A1 Apr. 4, 2013

(30) Foreign Application Priority Data

Sep. 30, 2011 (GB) .................................. 1116847.3

(51) Int. Cl.
H04R 29/00 (2006.01)
(52) U.S. Cl.
USPC .......................... 381/58; 381/71.1; 379/406.01
(58) Field of Classification Search
USPC ................ 381/56–58, 71.1, 71.11, 71.12, 92, 381/94.1, 95–96, 122, 66, 80, 107; 704/205, 224, 226, 233; 379/406.01–406.16
See application file for complete search history.

(56) References Cited

U.S. PATENT DOCUMENTS

| 4,849,764 | A | 7/1989 | van Heyningen |
| 5,524,059 | A | 6/1996 | Zurcher |
| 6,157,403 | A | 12/2000 | Nagata |
| 6,232,918 | B1 | 5/2001 | Wax et al. |
| 6,339,758 | B1 | 1/2002 | Kanazawa et al. |
| 6,914,854 | B1 | 7/2005 | Heberley et al. |
| 8,325,952 | B2 | 12/2012 | Cho |
| 8,401,178 | B2 * | 3/2013 | Chen et al. ............... 379/406.03 |

| 2002/0103619 | A1 * | 8/2002 | Bizjak ........................... 702/180 |
| 2002/0171580 | A1 | 11/2002 | Gaus et al. |
| 2004/0213419 | A1 | 10/2004 | Varma et al. |
| 2005/0149339 | A1 | 7/2005 | Tanaka et al. |
| 2005/0216258 | A1 | 9/2005 | Kobayashi et al. |
| 2006/0015331 | A1 | 1/2006 | Hui et al. |
| 2006/0133622 | A1 | 6/2006 | Chen |

(Continued)

FOREIGN PATENT DOCUMENTS

| CA | 2413217 | 5/2004 |
| CN | 100446530 | 3/2001 |

(Continued)

OTHER PUBLICATIONS

"International Search Report and Written Opinion", Application No. PCT/US2012/058146, (Jan. 21, 2013), 9 pages.

(Continued)

Primary Examiner — Vivian Chin
Assistant Examiner — Friedrich W Fahnert
(74) Attorney, Agent, or Firm — Sonia Cooper; Jim Ross; Micky Minhas

(57) ABSTRACT

Method, device and computer program product for processing audio signals at the device, the device comprising an audio output for outputting audio signals. Audio signals are received at a plurality of microphones of the device. A characteristic of at least one of the audio signals received by the plurality of microphones is measured. A beamformer applies beamformer coefficients to the received audio signals, thereby generating a beamformer output. An echo canceller is applied to the beamformer output, thereby suppressing, from the beamformer output, an echo resulting from audio signals output from the audio output, wherein an operating parameter of the echo canceller is controlled based on the measured characteristic of the at least one of the audio signals received by the plurality of microphones.

25 Claims, 6 Drawing Sheets

(56) References Cited

U.S. PATENT DOCUMENTS

| | | | |
|---|---|---|---|
| 2006/0269073 A1 | 11/2006 | Mao | |
| 2007/0164902 A1 | 7/2007 | Bang et al. | |
| 2008/0039146 A1 | 2/2008 | Jin | |
| 2008/0199025 A1 | 8/2008 | Amada | |
| 2008/0232607 A1 | 9/2008 | Tashev et al. | |
| 2008/0260175 A1 | 10/2008 | Elko | |
| 2009/0010453 A1 | 1/2009 | Zurek et al. | |
| 2009/0076810 A1 | 3/2009 | Matsuo | |
| 2009/0076815 A1 | 3/2009 | Ichikawa et al. | |
| 2009/0125305 A1 | 5/2009 | Cho | |
| 2009/0274318 A1 | 11/2009 | Ishibashi et al. | |
| 2009/0304211 A1 | 12/2009 | Tashev et al. | |
| 2010/0027810 A1 | 2/2010 | Marton | |
| 2010/0070274 A1 | 3/2010 | Cho et al. | |
| 2010/0128892 A1 | 5/2010 | Chen et al. | |
| 2010/0177908 A1 | 7/2010 | Seltzer et al. | |
| 2010/0215184 A1 | 8/2010 | Buck et al. | |
| 2010/0217590 A1 | 8/2010 | Nemer et al. | |
| 2010/0246844 A1 | 9/2010 | Wolff | |
| 2010/0296665 A1 | 11/2010 | Ishikawa et al. | |
| 2010/0315905 A1 | 12/2010 | Lee et al. | |
| 2010/0323652 A1 | 12/2010 | Visser et al. | |
| 2011/0038486 A1* | 2/2011 | Beaucoup | 381/56 |
| 2011/0038489 A1 | 2/2011 | Visser et al. | |
| 2011/0054891 A1 | 3/2011 | Vitte et al. | |
| 2011/0070926 A1 | 3/2011 | Vitte et al. | |
| 2011/0158418 A1 | 6/2011 | Bai et al. | |
| 2011/0178798 A1 | 7/2011 | Flaks et al. | |
| 2012/0182429 A1 | 7/2012 | Forutanpour et al. | |
| 2012/0303363 A1 | 11/2012 | Sorensen | |
| 2013/0013303 A1 | 1/2013 | Strommer | |
| 2013/0034241 A1 | 2/2013 | Pandey et al. | |
| 2013/0082875 A1 | 4/2013 | Sorensen | |
| 2013/0083832 A1 | 4/2013 | Sorensen | |
| 2013/0083936 A1 | 4/2013 | Sorensen | |
| 2013/0083942 A1 | 4/2013 | Åhgren | |
| 2013/0083943 A1 | 4/2013 | Sorensen | |
| 2013/0129100 A1 | 5/2013 | Sorensen | |
| 2013/0136274 A1 | 5/2013 | Åhgren | |
| 2013/0148821 A1 | 6/2013 | Sorensen | |

FOREIGN PATENT DOCUMENTS

| | | |
|---|---|---|
| CN | 1809105 | 7/2006 |
| CN | 101015001 | 8/2007 |
| CN | 101207663 | 6/2008 |
| CN | 100407594 | 7/2008 |
| CN | 101667426 | 3/2010 |
| CN | 102131136 | 7/2011 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 2026329 | 2/2009 |
| EP | 2159791 | 3/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2010098546 | 9/2010 |
| WO | WO-2012097314 | 7/2012 |

OTHER PUBLICATIONS

"International Search Report and Written Opinion", Application No. PCT/2012/066485, (Feb. 15, 2013), 12 pages.

"PCT Search Report and Written Opinion", Application No. PCT/US2012/2065737, (Feb. 13, 2013), 12 pages.

"PCT Search Report and Written Opinion", Application No. PCT/US/2012/045556, (Jan. 2, 2013), 10 pages.

"PCT Search Report and Written Opinion", Application No. PCT/US2012/068649, (Mar. 7, 2013), 9 pages.

"PCT Search Report and Written Opinion", Application No. PCT/US2012/058145, (Apr. 24, 2013), 18 pages.

"PCT Search Report and Written Opinion", Application No. PCT/US2012/058148, (May 3, 2013), 9 pages.

"PCT Search Report and Written Opinion", Application No. PCT/US2012/058147, (May 8, 2013), 9 pages.

"PCT Search Report and Written Opinion", Application No. PCT/US2012/058143, (Dec. 21, 2012), 12 pages.

Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514..

Grbic, Nedelko et al., "Soft Constrained Subband Beamforming for Hands-Free Speech Enhancement", *In Proceedings of ICASSP 2002*, (May 13, 2002), 4 pages.

Handzel, et al., "Biomimetic Sound-Source Localization", *IEEE Sensors Journal*, vol. 2, No. 6, (Dec. 2002), pp. 607-616.

Kellerman, W. "Strategies for Combining Acoustic Echo Cancellation and Adaptive Beamforming Microphone Arrays", *In Proceedings of ICASSP 1997*, (Apr. 1997), pp. 219-222.

"Search Report", GB Application No. 1108885.3, (Sep. 3, 2012), 3 pages.

"Search Report", GB Application No. 1111474.1, (Oct. 24, 2012), 3 pages.

"Search Report", GB Application No. 1116847.3, (Dec. 20, 2012), 3 pages.

"Search Report", Application No. GB1116846.5, Jan. 28, 2013, 3 pages.

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

"Search Report", GB Application No. 1121147.1, Feb. 14, 2013, 5 pages.

"UK Search Report", UK Application No. GB1116848.1, Dec. 18, 2012, 3 pages.

"Non-Final Office Action", U.S. Appl. No. 13/341,610, Dec. 27, 2013, 10 pages.

"Search Report", GB Application No. 1119932.0, Feb. 28, 2013, 8 pages.

"Non-Final Office Action", U.S. Appl. No. 13/307,852, Feb. 20, 2014, 5 pages.

"Foreign Office Action", CN Application No. 201210368101.5, Dec. 6, 2013, 9 pages.

"International Search Report and Written Opinion", Application No. PCT/US2013/058144, (Sep. 11, 2013),10 pages.

"Non-Final Office Action", U.S. Appl. No. 13/212,633, (Nov. 1, 2013),14 pages.

"Non-Final Office Action", U.S. Appl. No. 13/212,688, (Nov. 7, 2013),14 pages.

Knapp, et al., "The Generalized Correlation Method for Estimation of Time Delay", *IEEE Transactions on Acoustics, Speech, and Signal Processing*, vol. ASSP-24, No. 4, (Aug. 1976),pp. 320-327.

"Foreign Office Action", CN Application No. 201210377130.8, Jan. 15, 2014, 12 pages.

"Non-Final Office Action", U.S. Appl. No. 13/327,308, Mar. 28, 2014, 13 pages.

"International Search Report and Written Opinion", Application No. PCT/EP2012/059937, Feb. 14, 2014, 9 pages.

"Final Office Action", U.S. Appl. No. 13/212,633, May 23, 2014, 16 pages.

"Final Office Action", U.S. Appl. No. 13/212,688, Jun. 5, 2014, 20 pages.

"Non-Final Office Action", U.S. Appl. No. 13/307,852, May 16, 2014, 4 pages.

"Notice of Allowance", U.S. Appl. No. 13/308,106, Jun. 27, 2014, 7 pages.

\* cited by examiner

PROCESSING AUDIO SIGNALS

RELATED APPLICATION

This application claims priority under 35 U.S.C. §119 or 365 to Great Britain, Application No. GB1116847.3, filed Sep. 30, 2011.

The entire teachings of the above application are incorporated herein by reference.

TECHNICAL FIELD

The present invention relates to processing audio signals received at a device.

BACKGROUND

A device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focussing the audio signals received by a microphone array by applying signal processing to enhance particular audio signals received at the microphone array from one or more desired locations (i.e. directions and distances) compared to the rest of the audio signals received at the microphone array. For simplicity we will describe the case with only a single desired direction herein, but the same method will apply when there are more directions of interest. The angle (and/or the distance) from which the desired audio signal is received at the microphone array, so-called Direction of Arrival ("DOA") information, can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. Adaptive beamformers apply a number of weights (or "beamformer coefficients") to the received audio signals. These weights can be adapted to take into account the DOA information to process the audio signals received by the plurality of microphones to form a "beam" whereby a high gain is applied to desired audio signals received by the microphones from a desired location (i.e. a desired direction and distance) and a low gain is applied in the directions to any other (e.g. interfering) signal sources. The beamformer may be "adaptive" in the sense that the suppression of interfering sources can be adapted, the selection of the desired source/look direction may not necessarily be adaptable.

As well as having a plurality of microphones for receiving audio signals, a device may also have audio output means (e.g. comprising a loudspeaker) for outputting audio signals. Such a device is useful, for example where audio signals are to be outputted to, and received from, a user of the device, for example during a communication event. For example, the device may be a user device such as a telephone, computer or television and may include equipment necessary to allow the user to engage in teleconferencing.

Where a device includes both audio output means (e.g. including a loudspeaker) and audio input means (e.g. microphones) then there is often a problem when an echo is present in the received audio signals, wherein the echo results from audio signals being output from the loudspeaker and received at the microphones. An echo canceller may be used to cancel the echo in the audio signals received at the microphones. Echo suppression and echo subtraction are two methods of implementing an echo canceller. For example, an echo canceller may implement an echo suppressor which is used to suppress the echo in the audio signals received at the microphones. The path of propagation of an audio signal from the loudspeaker to the microphone is known as the echo path, and an echo suppressor may estimate the echo path gain as a function of time and frequency and use this to estimate the echo power in the received audio signals. The estimate of the echo power in the received audio signals can be used to suppress the echo in the received audio signals to a level such that they are not noticeable in the presence of any near-end signals (signal components in the audio signals received at the microphones that are not originating from the loudspeakers). The estimation of the echo power in the received audio signals is based on a model of the loudspeaker-enclosure-microphone system in which the echo canceller is operating. The model is often, at least partly, linear, but in some cases the model may be non-linear. A hybrid echo canceller consists of an echo subtractor and an echo suppressor applied in a cascaded manner. By using a hybrid echo canceller, increased doubletalk transparency is achieved by the echo subtractor, and if needed an additional echo suppression gain is achieved by the echo suppressor.

Common requirements for optimum operation of the echo cancellation are that:
  The echo path is relatively slowly varying since otherwise the echo path gain estimate would rapidly be inaccurate;
  The system is sufficiently linear to be modelled by a linear echo model; and
  The echo path gain should not be underestimated, since underestimation would in turn also cause the echo power to be underestimated. This would cause the echo canceller to apply too little suppression and thereby pass through residual echoes that are non-negligible.

It is not a trivial task to implement both a beamformer and an echo canceller on received audio signals. Indeed, when incorporating an adaptive microphone beamformer (e.g. in a teleconferencing application) care needs to be taken so that the echo canceller performance is not reduced by the adaptivity in the beamforming.

In a first system implementing beamforming and echo cancellation together, a separate echo canceller is applied for each microphone signal before the beamforming is performed. However, this first system is very computationally complex due the operation of multiple echo cancellers for the multiple microphone signals. Furthermore, the use of echo cancellers (in particular the use of echo cancellers implementing echo suppression) on the microphone signals may disturb the beamforming process of the beamformer.

In a second system implementing beamforming and echo cancellation together, an echo canceller is applied to the output of the beamformer. In this second system the behaviour of the data-adaptive beamformer is preferably constrained to be changing very slowly over time, since otherwise the accuracy estimates of the echo path used in the echo suppression implemented by the echo canceller will be detrimentally affected as the echo canceller attempts to adjust the echo path estimates in response to the changes in the beamformer behaviour. Furthermore in this second system the beamformer is preferably constrained to be linear in order to prevent a detrimental reduction in the achievable echo cancellation performance of the echo suppression implemented by the echo canceller in terms of near-end transparency. Some beamformers are linear, but some are not linear, so the choice of beamformers is restricted (to being a linear beamformer) in the second system.

Therefore, there are problems with both the first system and the second system described above.

SUMMARY

Embodiments of the present invention allow for a microphone beamformer to be used together with an echo canceller without in any way restricting the beamformer type or behaviour and without affecting the echo canceller performance. Embodiments of the invention compute the echo canceller behaviour based on the strongest of the microphone signals before the beamformer, and apply the echo canceller on the beamformer output.

The term "strongest" audio signal may mean the one of the received audio signals that has the highest average power over time. However, the "strongest" audio signal may mean the one of the received audio signals that over time on average has the highest absolute value, or the audio signal that instantaneously has the strongest power.

According to a first aspect of the invention there is provided a method of processing audio signals at a device, the device comprising audio output means for outputting audio signals, the method comprising: receiving audio signals at a plurality of microphones of the device; measuring a characteristic of at least one of the audio signals received by the plurality of microphones; a beamformer applying beamformer coefficients to the received audio signals, thereby generating a beamformer output; and applying an echo canceller to the beamformer output, thereby suppressing, from the beamformer output, an echo resulting from audio signals output from the audio output, wherein an operating parameter of the echo canceller is controlled based on the measured characteristic of the at least one of the audio signals received by the plurality of microphones.

Advantageously, the computational complexity of embodiments of the invention is low because the echo canceller is applied to the beamformer output, rather than to each of the received audio signals prior to the beamformer. Fewer echo cancellers are therefore required. In preferred embodiments only one echo canceller is used, that being applied to the beamformer output. Furthermore, the performance of the beamformer is not adversely affected by the echo canceller because the echo canceller does not alter the received audio signals prior to the application of the beamformer coefficients by the beamformer to the received audio signals. Furthermore, the behaviour of the beamformer is not limited due to a requirement that the beamformer output is slowly varying because the operating parameter of the echo canceller is controlled based on a characteristic of one or more of the received audio signals, prior to the application of the beamformer coefficients by the beamformer. In this way, the operating parameter of the echo canceller is not affected by the behaviour of the beamformer and as such the beamformer output is not required to be slowly varying in order for the echo canceller to function correctly. Similarly, since the operating parameter of the echo canceller is controlled based on the characteristic of at least one of the received audio signals prior to the beamforming process the beamformer coefficients applied by the beamformer are not limited to necessarily being linear (although the beamformer coefficients may be linear in some embodiments).

In preferred embodiments the at least one of the audio signals received by the plurality of microphones from which the characteristic is measured comprises the strongest of the received audio signals, and the method may comprise a step of determining which of the received audio signals is the strongest of the received audio signals. The at least one of the audio signals received by the plurality of microphones from which the characteristic is measured may comprise one of the received audio signals other than the strongest audio signal.

Furthermore, the step of measuring a characteristic of at least one of the audio signals may comprise measuring an echo path gain from the at least one of the audio signals received by the plurality of microphones. The method may further comprise using said measured echo path gain to determine an estimate of the echo power in the beamformer output, wherein said operating parameter is controlled based on the estimate of the echo power in the beamformer output. The operating parameter may comprise a level of echo suppression which is applied by the echo canceller (e.g. by echo suppressing means of the echo canceller) to the beamformer output. Advantageously, in preferred embodiments the estimate of the echo power in the beamformer output determined from the echo path gain measured from the strongest of the received audio signals is guaranteed not to be an underestimate of the echo power in the beamformer output, thereby ensuring that the echo canceller do not apply too little echo suppression to the beamformer output.

In preferred embodiments, the method further comprises determining a beamformer gain that is applied by the beamformer to the audio signals that are received by the plurality of microphones from a principal direction of the beamformer, wherein said beamformer gain is used in said determination of the estimate of the echo power in the beamformer output. The determined estimate of the echo power may represent an upper bound of the echo power in the beamformer output.

The method may further comprise adapting the beamformer coefficients of the beamformer based on an analysis of the received audio signals. For example, the beamformer coefficients may be adapted so as to minimise the power in the beamformer output within beamforming constraints of the beamformer. The beamforming constraints of the beamformer may, for example, comprise a constraint that an audio signal received at the plurality of microphones in a principal direction of the beamformer is not distorted by the application of the beamformer coefficients. The beamformer coefficients may describe either a linear function or a non-linear function of the received audio signals. For example, the beamformer may be a Minimum Variance Distortionless Response (MVDR) beamformer.

According to a second aspect of the invention there is provided a device for processing audio signals, the device comprising: an audio output for outputting audio signals; a plurality of microphones for receiving audio signals; a beamformer configured to apply beamformer coefficients to the received audio signals, to thereby generate a beamformer output; echo canceller configured to be applied to the beamformer output, to thereby suppress, from the beamformer output, an echo resulting from audio signals output from the audio output; and means for measuring a characteristic of at least one of the audio signals received by the plurality of microphones, and for controlling an operating parameter of the echo canceller based on the measured characteristic of the at least one of the audio signals received by the plurality of microphones.

The echo canceller may be arranged to apply echo suppression to the beamformer output. The echo canceller may be further arranged to apply echo subtraction to each of the audio signals received by the plurality of microphones prior to application of the beamformer coefficients to the received audio signals by the beamformer.

According to a third aspect of the invention there is provided a computer program product for processing audio signals at a device, the device comprising a plurality of microphones for receiving audio signals and an audio output for outputting audio signals, the computer program product being embodied on a non-transient computer-readable medium and configured so as when executed on a processor of the device to perform the steps of: measuring a characteristic of at least one of the audio signals received by the plurality of microphones; using a beamformer to apply beamformer coefficients to the received audio signals, thereby generating a beamformer output; and applying an echo canceller to the beamformer output, thereby suppressing, from the beamformer output, an echo resulting from audio signals output from the audio output, wherein an operating parameter of the echo canceller is controlled based on the measured characteristic of the at least one of the audio signals received by the plurality of microphones.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
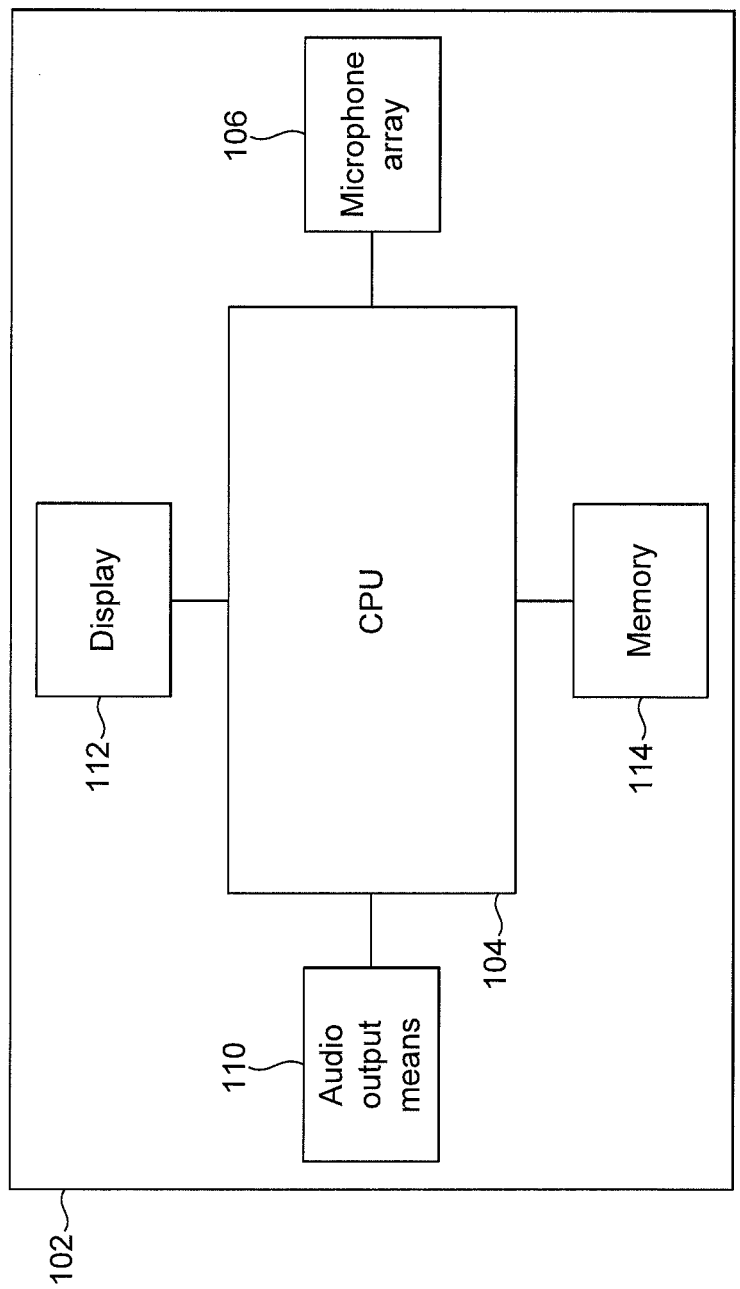
FIG. 1 shows a schematic view of a device according to a preferred embodiment.

Preferred embodiments of the invention will now be described by way of example only. It may be desirable to implement both a beamformer and an echo canceller at a device, for example, for use with a teleconferencing application. In the following embodiments of the invention, techniques are described which allow a beamformer to be used together with an echo canceller without restricting the beamformer type or beamformer behaviour and without affecting the performance of the echo canceller.

A beamformer can be modelled as follows. The purpose of a microphone beamformer is to combine several microphone signals in order to produce a beamformer output. The beamformer output may consist of many signals, but for simplicity, in the preferred embodiments described below it will be assumed that the beamformer produces one single output. There are many different beamforming algorithms which may be used and a common model to describe the beamforming algorithms is $$y(t)=f(y_1(t),y_2(t),\ldots,y_N(t)),$$

where y(t) is the beamformer output, $y_n(t)$ is the nth input signal from the nth microphone in a microphone array, N is the total number of beamformer input signals and f( ) is the beamformer function. The beamformer function f( ) may take one of many different forms and may be linear or non linear. For a Delay-and-sum beamformer the beamforming algorithm is given by:

$$y(t)=\Sigma_{n=1}^{N}y_n(t).$$

For an MVDR beamformer the beamforming algorithm is given by:

$$y(t)=\Sigma_{n=1}^{N}g_n*y_n(t),$$

where $g_n(t)$ is a weighting factor for the nth input signal.

An echo canceller which operates to cancel echo in a single microphone input signal y(t) can be modelled as follows. The echo path is the path of propagation for a loudspeaker signal x(t) to the microphone signal y(t). An echo canceller using echo suppression may operate by estimating the echo path gain $|H(t,f)|^2$ for time t and frequency f, and using the estimate $|\hat{H}(t,f)|^2$ of the echo path gain to estimate the echo power $|S(t,f)|^2$ in the received audio signal. This estimation of the echo power may be performed based on a linear model of the loudspeaker-enclosure-microphone system on which the echo canceller is operating, according to the equations:

$$Y(t,f)=S(t,f)+N(t,f)=H(t,f)X(t,f)+N(t,f)$$

$$S(t,f)=H(t,f)X(t,f)$$

where Y(t, f) is the frequency estimate (e.g. digital Fourier transform) for the microphone signal, X(t, f) is the frequency estimate for the loudspeaker signal, S(t, f) is the frequency estimate for the echo signal, H(t, f) is the frequency response of the echo path, and N(t, f) is the frequency estimate of all near-end sound, microphone noise and modelling errors (that is all the received audio signals other than the echo). It is assumed that the transforms used to compute the frequency estimates are all of sufficient orders for the echo cancellation model to be valid. The frequency estimate for the loudspeaker signal X(t, f) is known because the device will know what signal is being output from its loudspeaker. Therefore, in order to determine the echo power $|S(t, f)|^2$ the frequency response of the echo path $H(t, f)$ should be estimated.

The echo path gain estimate $|\hat{H}(t, f)|^2$ may be estimated from the model as a function of $Y(t, f)$ and $X(t, f)$ under the assumption that $X(t, f)$ is uncorrelated with $N(t, f)$. Furthermore, the estimation speed, or confidence in the estimates, may be adjusted based on the expected echo to near-end ratio, which limits the possible accuracy of the estimation, i.e., the estimate is mainly updated when the echo power is expected to be strong in the microphone signal. One estimation method which may be used is the least squares estimation method.

The echo path gain estimate $|\hat{H}(t, f)|^2$ is used to estimate the echo power $|\hat{S}(t, f)|^2$ using the model above, that is:

$$|\hat{S}(t,f)|^2 = |\hat{H}(t,f)|^2 |X(t,f)|^2.$$

Common requirements for optimum operation of the echo cancellation are that:

The echo path is relatively slowly varying since otherwise the echo path gain estimate would rapidly be inaccurate.

The system is sufficiently linear to be modelled by the linear echo model above.

The echo path gain should not be underestimated, i.e., $|\hat{H}(t, f)|^2 \geq |\hat{H}(t, f)|^2$, since underestimation would in turn also cause the echo power $|\hat{S}(t, f)|^2$ to be underestimated. This would cause the echo canceller to apply too little suppression and thereby pass through residual echoes that are non-negligible.

Reference is now made to FIG. 1 which illustrates a schematic view of a device 102. The device 102 may be a fixed or a mobile device. The device 102 comprises a CPU 104, to which is connected a microphone array 106 for receiving audio signals, audio output means 110 for outputting audio signals, a display 112 such as a screen for outputting visual data to a user of the device 102 and a memory 114 for storing data.

Figure 2:
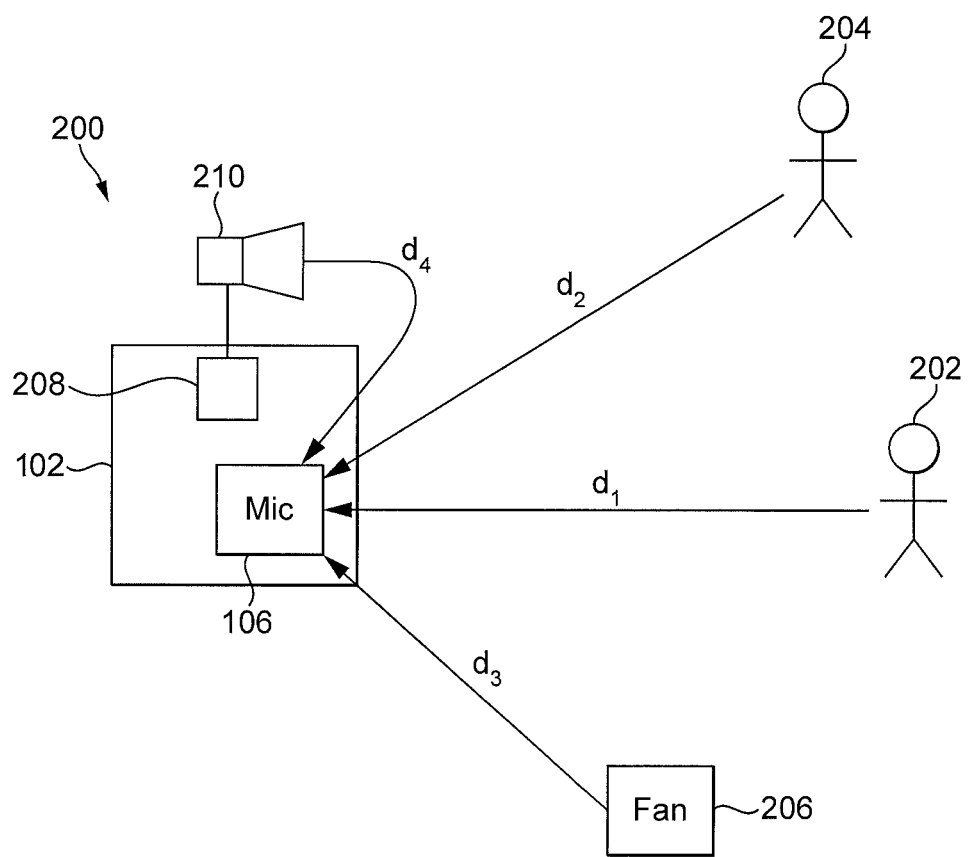
FIG. 2 shows a system according to a preferred embodiment.

Reference is now made to FIG. 2, which illustrates an example environment 200 in which the device 102 operates.

The microphone array 106 of the device 102 receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from a loudspeaker 210 (as denoted $d_4$ in FIG. 2). The audio output means 110 of the device 102 comprise audio output processing means 208 and the loudspeaker 210. The audio output processing means 208 operates to send audio output signals to the loudspeaker 210 for output from the loudspeaker 210. The audio output processing means 208 may operate as software executed on the CPU 104, or as hardware in the device 102. It will be apparent to a person skilled in the art that the microphone array 106 may receive other audio signals than those shown in FIG. 2. In the scenario shown in FIG. 2 the audio signals from the user 202 are the desired audio signals, and all the other audio signals which are received at the microphone array 106 are interfering audio signals. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. Other sources of unwanted noise signals may include for example air-conditioning systems, a device playing music and reverberance of audio signals, e.g. off a wall in the environment 200.

Figure 3:
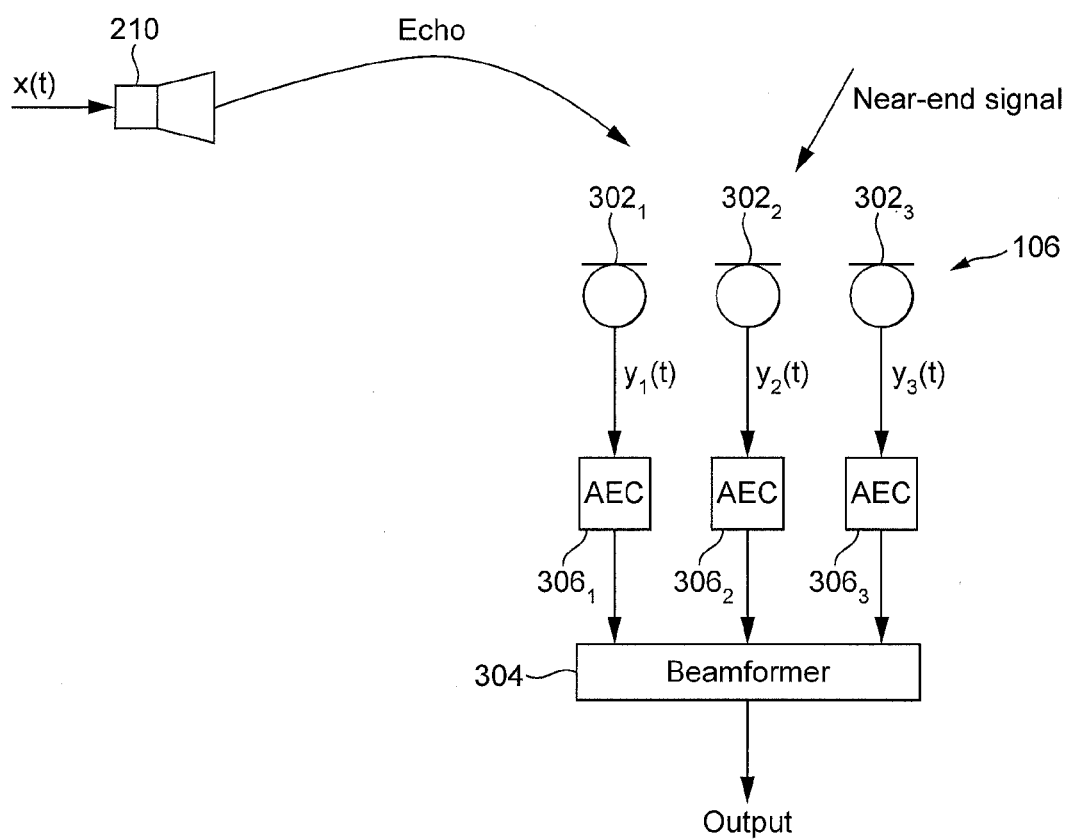
FIG. 3 shows a functional block diagram of elements of a device according to a first prior art system.

Reference is now made to FIG. 3 which illustrates a functional representation of elements of a first prior art device.

The microphone array 106 comprises a plurality of microphones $302_1$, $302_2$ and $302_3$. The first prior art device further comprises a beamformer 304. The output of each microphone in the microphone array 106 is coupled to a respective input of a plurality of acoustic echo cancellers $306_1$, $306_2$ and $306_3$. In this way there is one echo canceller 306 for each received audio signal (denoted $y_1(t)$, $y_2(t)$ and $y_3(t)$ in FIG. 3). The output of each echo canceller 306 is coupled to a respective input of the beamformer 304. Persons skilled in the art will appreciate that multiple inputs are needed in order to implement beamforming. As shown in FIG. 3, the microphones $302_1$, $302_2$ and $302_3$ receive near end audio signals as well as echo audio signals which are output from the loudspeaker 210.

In the first prior art device, a separate echo canceller 306 is applied for each received audio signal $y(t)$ before the beamforming is performed by the beamformer 304. Therefore, as described above, the first prior art device shown in FIG. 3 is computationally complex because multiple echo cancellers 306 are implemented. Furthermore, the introduction of the echo cancellers 306 may disturb the beamforming process of the adaptive beamformer 304.

Figure 4:
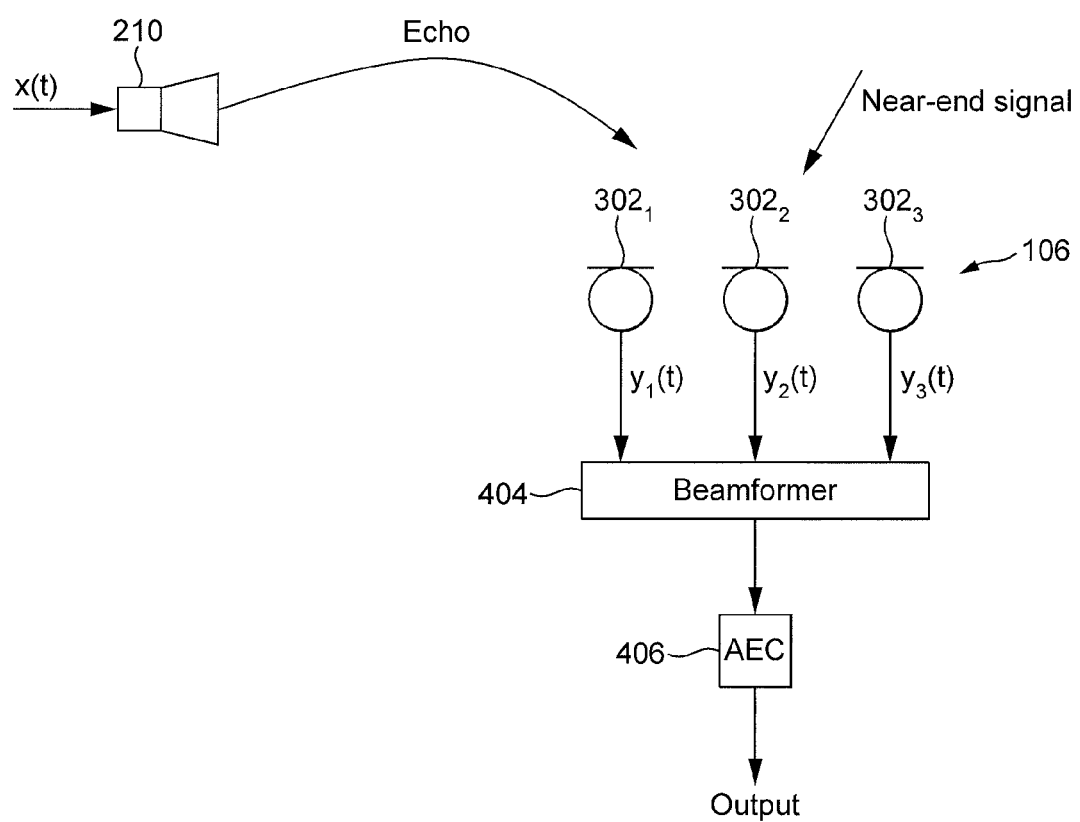
FIG. 4 shows a functional block diagram of elements of a device according to a second prior art system.

Reference is now made to FIG. 4 which illustrates a functional representation of elements of a second prior art device. Similarly, to the first prior art device shown in FIG. 3, the second prior art device has a microphone array 106 comprising a plurality of microphones $302_1$, $302_2$ and $302_3$ and a beamformer 404. However, in the second prior art device the output of each microphone in the microphone array 106 is coupled to a respective input of the beamformer 404, and the output of the beamformer 404 is coupled to an input of an acoustic echo canceller 406. In this way, the beamforming process is applied by the beamformer 404 prior to the echo cancellation process by the echo canceller 406. The second prior art device removes the need for multiple echo cancellers, but there are drawbacks with the second prior art device. For example, the operation of the beamformer 404 needs to be adjusted to be varying very slowly in the second prior art device, since otherwise the echo canceller 406 would not be able to adjust to the changes in the beamformer behaviour quickly enough to provide satisfactory suppression of the echo in the received audio signals. Furthermore, in order for the echo canceller 406 to operate correctly, the beamformer 404 is preferably required to be linear. This restricts the options for implementations of the beamformer 404.

Figure 5:
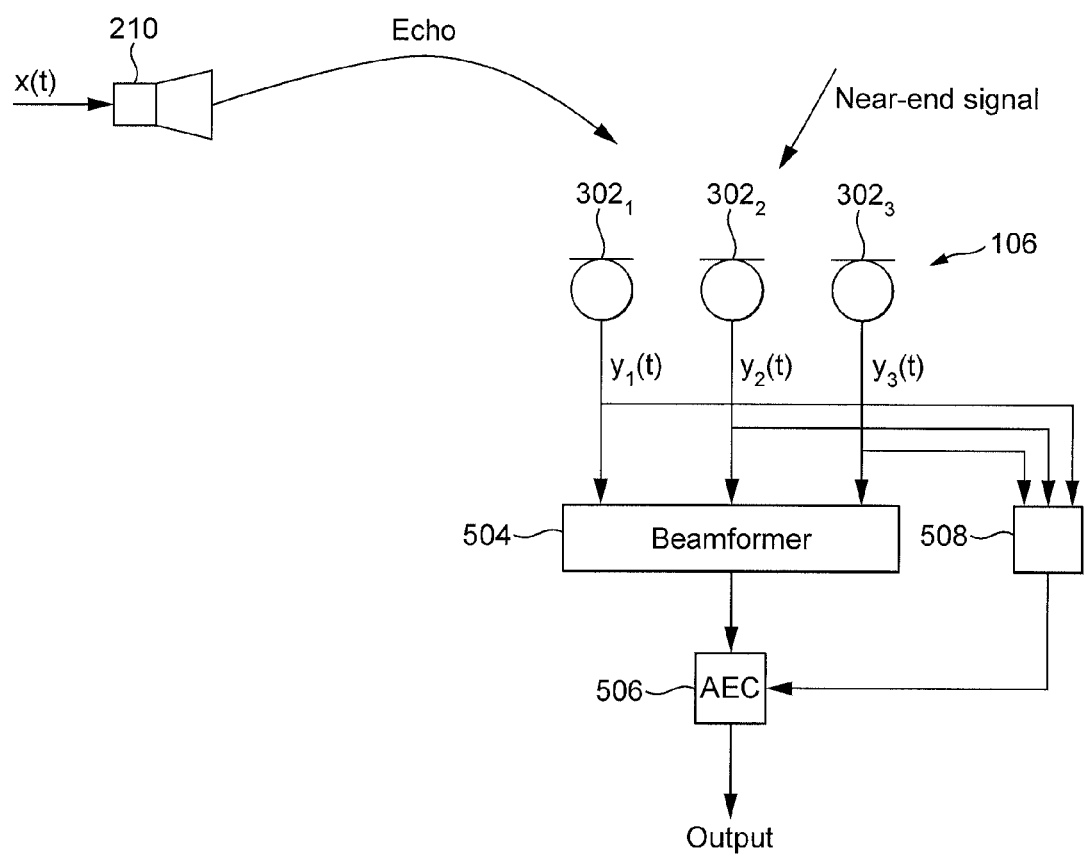
FIG. 5 shows a functional block diagram of elements of a device according to a preferred embodiment.

Reference is now made to FIG. 5 which illustrates a functional representation of elements of the device 102 according to a preferred embodiment of the invention. The microphone array 106 comprises a plurality of microphones $302_1$, $302_2$ and $302_3$. The device 102 further comprises a beamformer 504, an acoustic echo canceller 506 and a processing block 508. The beamformer 504 may for example be a Minimum Variance Distortionless Response (MVDR) beamformer. The beamformer 504, echo canceller 506 and processing block 508 may be implemented in software executed on the CPU 104 or implemented in hardware in the device 102. The output of each microphone in the microphone array 106 is coupled to a respective input of the beamformer 504. The output of each microphone in the microphone array 106 is also coupled to a respective input of the processing block 508. An output of the beamformer 504 is coupled to an input of the echo canceller 506. An output of the processing block 508 is coupled to an input of the echo canceller 506 to thereby provide side information to the echo canceller 506. Persons skilled in the art will appreciate that multiple inputs are needed in order to implement beamforming. The microphone array 106 is shown in FIG. 5 as having three microphones ($302_1$, $302_2$ and $302_3$), but it will be understood that this number of microphones is merely an example and is not limiting in any way.

The beamformer 504 includes means for receiving and processing the audio signals $y_1(t)$, $y_2(t)$ and $y_3(t)$ from the microphones $302_1$, $302_2$ and $302_3$ of the microphone array 106. For example, the beamformer 504 may comprise a voice activity detector (VAD) and a DOA estimation block (not shown in the Figures). In operation the beamformer 504 ascertains the nature of the audio signals received by the microphone array 106 and based on detection of speech like qualities detected by the VAD and the DOA estimation block, one or more principal direction(s) of the main speaker(s) is determined. In other embodiments the principal direction(s) of the main speaker(s) may be pre-set such that the beamformer 304 focuses on fixed directions. In the example shown in FIG. 2 the direction of audio signals ($d_1$) received from the user 202 is determined to be the principal direction. The beamformer 504 may use the DOA information (or may simply use the fixed look direction which is pre-set for use by the beamformer 304) to process the audio signals by forming a beam that has a high gain in the direction from the principal direction ($d_1$) from which wanted signals are received at the microphone array 106 and a low gain in the directions to any other signals (e.g. $d_2$, $d_3$ and $d_4$).

The beamformer 504 can also determine the interfering directions of arrival ($d_2$, $d_3$ and $d_4$), and advantageously the behaviour of the beamformer 504 can be adapted such that particularly low gains are applied to audio signals received from those interfering directions of arrival in order to suppress the interfering audio signals. Whilst it has been described above that the beamformer 504 can determine any number of principal directions, the number of principal directions determined affects the properties of the beamformer, e.g. for a large number of principal directions the beamformer 504 will apply less attenuation of the signals received at the microphone array from the other (unwanted) directions than if only a single principal direction is determined. The output of the beamformer 504 is provided to the echo canceller 506 in the form of a single channel to be processed. It is also possible to output more than one channel, for example to preserve or to virtually generate a stereo image. The output of the echo canceller 506 may be used in many different ways in the device 102 as will be apparent to a person skilled in the art. For example, the output of the echo canceller 506 could be used as part of a communication event in which the user 202 is participating using the device 102.

Figure 6:
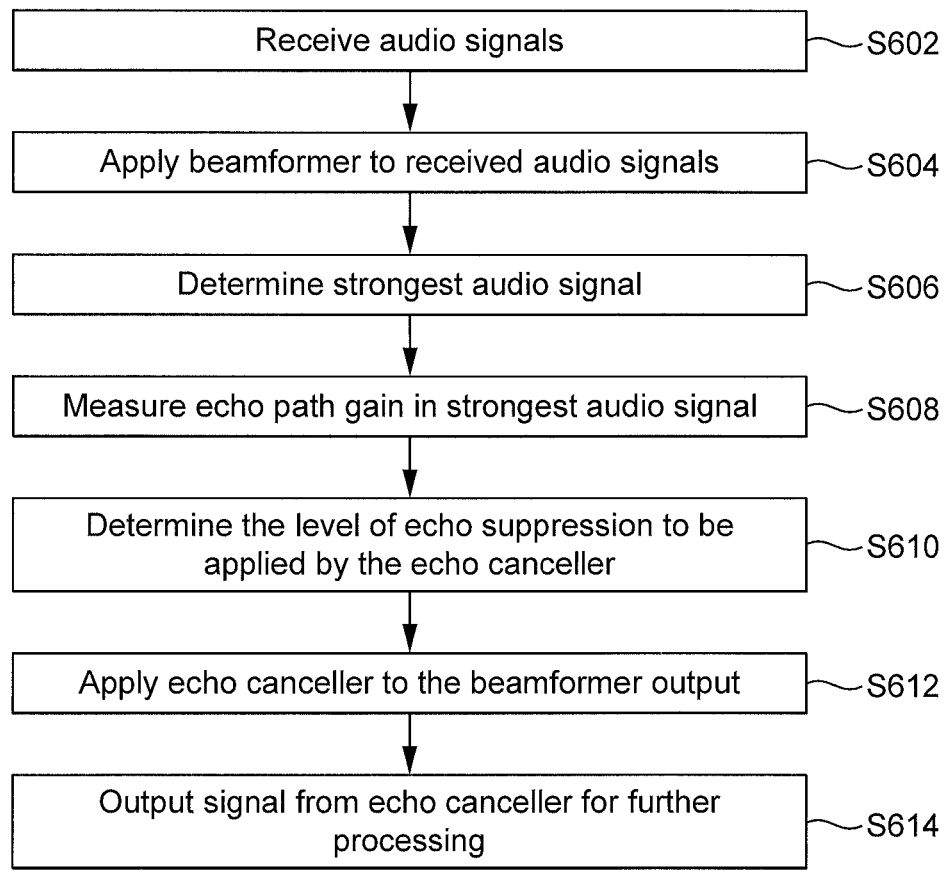
FIG. 6 is a flow chart for a process of processing audio signals according to a preferred embodiment.

With reference to FIG. 6 there is now described a method of processing audio signals according to a preferred embodiment. In step S602 audio signals are received at the microphones ($302_1$, $302_2$ and $302_3$) of the microphone array 106. The audio signals are received, for example, from the user 202, the user 204 and the fan 206, and these audio signals constitute the near-end audio signals as shown in FIG. 2 and FIG. 5. The microphones in the microphone array 106 also receive an echo signal from the loudspeaker 210 as shown in FIG. 2 and FIG. 5. Other interfering audio signals, such as background noise, may also be received at the microphones ($302_1$, $302_2$ and $302_3$) of the microphone array 106, and these other interfering audio signals will constitute further near-end audio signals. The audio signals $y_1(t)$, $y_2(t)$ and $y_3(t)$ received by each microphone ($302_1$, $302_2$ and $302_3$) of the microphone array 106 are passed to the beamformer 504 and to the processing block 508. The echo signal is the result of the audio output processing means 208 sending the loudspeaker audio signal x(t) to the loudspeaker 210 and the loudspeaker outputting the loudspeaker audio signal x(t). The loudspeaker audio signal x(t) propagates through the echo path (described by H(t, f)) and is present in the received audio signals $y_1(t)$, $y_2(t)$ and $y_3(t)$.

In step S604 the beamformer 504 applies its beamformer filter coefficients to the received audio signals ($y_1(t)$, $y_2(t)$ and $y_3(t)$) to thereby generate a beamformer output. As described above the beamformer 504 focuses on audio signals received at the microphone array 106 from the principal direction ($d_1$) to thereby enhance the desired audio signals received from the user 202, and to apply suppression to other audio signals received at the microphone array 106 from other directions. The beamformer 504 should have a fixed gain for audio signals received from the principal location (i.e. direction and distance), wherein the beamformer gain should preferably be constant over time (but possibly not constant over frequency) to thereby prevent distortion of the desired audio signals. As an example, the beamformer gain may be set to a value of 1 for the principal location (i.e. principal direction and/or distance). The task of the beamformer 504 is to enhance the signals from the principal source relative to other disturbing sources. The beamformer output is passed to the echo canceller 506.

In step S606 the processing block 508 analyses the received audio signals $y_1(t)$, $y_2(t)$ and $y_3(t)$ to determine which is the strongest of the received audio signals $y_1(t)$, $y_2(t)$ and $y_3(t)$. In other embodiments one of the received audio signals other than the strongest audio signal is chosen in step S606, but in the preferred embodiments the strongest audio signal is chosen. The strongest of the received audio signals $y_{max}(t)$ may be passed from the processing block 508 to the echo canceller 506 as side information. In this sense the strongest of the received audio signals prior to application of the beamformer 504 to the audio signals is determined. The strongest of the received audio signals is determined by finding which of the received audio signals satisfies the equation:

$$|Y_{max}(t,f)|^2 \geq |Y_k(t,f)|^2 \, k=1, \ldots, N.$$

In other embodiments the strongest of the received audio signals may be determined according to some other equation. For example, "strongest" audio signal be the one of the received audio signals that has the highest average power over time. Alternatively, the "strongest" audio signal may be the one of the received audio signals that over time on average has the highest absolute value, or the audio signal that instantaneously has the strongest power.

In step S608 the echo path gain $|H_{max}(t,f)|^2$, of the strongest audio signal is measured. This involves finding an estimate of the echo path gain $|\hat{H}_{max}(t,f)|^2$ according to the equation:

$$Y_{max}(t,f) = H_{max}(t,f)X(t,f) + N_{max}(t,f),$$

where, as described above, it is assumed that X(t, f) is uncorrelated with N(t, f) in the estimation.

In step S610 the level of echo suppression to be applied by the echo canceller 506 is determined. This determination is based on an estimate of the echo power $|\tilde{S}(t,f)|^2$ in the received audio signals. The echo power is estimated by multiplying the echo path gain of the strongest audio signal In $|\hat{H}_{max}(t,f)|^2$ measured in step S608 with the loudspeaker signal $|X(t,f)|^2$ which is output from the loudspeaker 210, that is:

$$|\tilde{S}(t,f)|^2 = |\hat{H}_{max}(t,f)|^2 |X(t,f)|^2.$$

In this way, in preferred embodiments the echo power is estimated based on the echo path gain of the strongest of the n received audio signals $y_n(t)$. Steps S608 and S610 may be performed by the processing block 508 with the results being passed to the echo canceller 506 as side information. Alternatively, one or both of steps S608 and S610 may be performed by the echo canceller 506 itself based on side information of the strongest received audio signal which is received at the echo canceller 506 from the processing block 508.

In step S612 the echo canceller 506 is applied to the beamformer output, wherein the level of suppression applied by the echo canceller 506 is that determined in step S610. In step S614 the signal is output from the echo canceller 506 for further processing in the device 102. For example the signal output from the echo canceller 506 may be used in a communication event, for example for transmission to another device over a network as a speech signal from the user 202 to another user as part of an audio or video call.

In contrast to the model of the echo canceller described above for application to a single received audio signal (in the absence of beamforming), the echo canceller 506 of the preferred embodiment is applied on the beamformer output. The beamforming process will affect the echo signal in the audio signal received at the echo canceller 506, and therefore the echo canceller system model needs to be revised to be applicable to the beamformer output. As described above, for each of the n received audio signals the following equation is used:

$$Y_n(t,f) = H_n(t,f)X(t,f) + N_n(t,f).$$

The signal (Y(t, f)) received at the echo canceller 506 is the output of the beamformer 504, and as such is a combination of the received audio signals ($Y_n$(t, f), where the combination is in accordance with the beamformer algorithm used by the beamformer. That is, $$Y(t,f) = F(Y_1(t,f), \ldots, Y_N(t,f)) = F(H_n(t,f)X(t,f) + N_n(t,f), \ldots, H_N(t,f)X(t,f) + NNt,f,$$

where F( ) is the frequency domain representation of the beamformer function f( ).

It can be appreciated from the equations above why the second prior art device shown in FIG. 4 needs to impose requirements on the beamforming functionality in order for the echo canceller 406 to successfully cancel the echo. In particular, the beamformer 404 is preferably required to be composed of a linear combination of the microphone inputs (i.e. $f$( ) must be a linear function) for the system model to be linear, otherwise the linear model for the echo power used to estimate the echo power for use by the echo canceller 406 is no longer feasible, and a nonlinear model may need to be used which may reduce the near-end transparency of the echo canceller 406. Furthermore, the beamformer behaviour needs to be slowly varying with time, since otherwise the system above would be highly time-varying and echo cancellation in the echo canceller 406 would not be as transparent to near-end signals due to a less accurate estimation of the echo path.

The preferred embodiments of the present invention overcome these problems by estimating the echo power on the basis of the echo path gain of the strongest of the received audio signals as described above. This has the following advantages:

1. From the basic assumptions and requirements behind standard echo cancellation, $Y_{max}$(t, f) and X(t, f) are preferably linearly related regardless of the type of the beamformer (because $Y_{max}$(t, f) relates to the audio signal prior to the beamforming process) and thus this relation can be well approximated by $|\hat{H}_{max}(t, f)|^2$ using a linear estimation method. Therefore the estimate of the echo power $|\tilde{S}(t, f)|^2$ can be validly determined using the linear model described above even if the beamformer 504 does not use a linear function $f$( ). This relaxes the constraints on the beamformer 504 such that the beamforming function $f$( ) may be linear or nonlinear. It is noted that echo cancellers may include nonlinear models to deal with nonlinearities in the echo path. However, introducing further nonlinearities in the echo path, some of which may even not be able to be modelled, will have an impact on the near-end transparency of the echo canceller.

2. The time-variations of $|\hat{H}_{max}(t, f)|^2$ should be the same as for the standard echo cancellation case, regardless of the beamformer behaviour. This is because the estimate of the echo path gain of the strongest received audio signal $|\hat{H}_{max}(t, f)|^2$ is determined prior to the beamforming process. This relaxes the constraints on the beamformer 504 such that the beamformer output may vary slowly or quickly in time without adversely affecting the estimation of the echo power $|\tilde{S}(t, f)|^2$ for use by the echo canceller 506.

3. Since (in preferred embodiments) the echo path gain is estimated based on the strongest microphone signal, and since the echo power to near-end ratio difference between the microphones in the array is only minor due to the limited width of the microphone array 106 the echo power estimate $|\tilde{S}(t, f)|^2$ is bounded as:

$$|\tilde{S}(t, f)|^2 \geq \frac{1}{B(f)} |S(t, f)|^2,$$

where $|S(t, f)|^2$ is the actual echo power in the beamformer output, and B (f) is a constant beamformer gain of the beamformer 504 which is applied by the beamformer 504 to the received audio signals in the principal direction of the beamformer 504. Typically, the beamformer gain B(f) is chosen to be 1 for all frequencies $f$. The value of B(f) $|\tilde{S}(t, f)|^2$ is used as the estimate of the echo power in the beamformer output. This is because we know that the beamformer 504 at most applies the frequency dependent gain B(f) in the look direction. Some constraints may be placed on B(f), such as for example that it is known that the beamformer gain for the direction of the loudspeaker 210 is less than B(f). An explanation of this bounding of the echo power estimate is as follows. The beamformer 504 enhances desired audio signals coming from the principal direction compared to undesired audio signals coming from other directions. The enhancement may mean that the desired signals are amplified or that the undesired signals are attenuated, or both things at the same time. In preferred embodiments, a requirement of the beamformer 504 is that the amplification of the audio signals in the principal direction (i.e. the "look direction") of the beamformer 504 should be constant over time, since otherwise the desired audio signals would be distorted by the beamformer 504. Thus the following equation will always hold true:

$$|Y(t,f)|^2 = |F(Y_1(t,f), \ldots, Y_N(t,f))|^2 \leq B(f) \max\{|Y_1(t,f)|^2, \ldots, |Y_N(t,f)|^2\}) = B(f)|Y_{max}(t,f)|^2,$$

where as described above, Y(t, f) represents the beamformer output in the frequency domain and $Y_n$(t, f) represents the received audio signal of the nth microphone of the microphone array 106 in the frequency domain. The beamformer 504 may be computed as the average of the input signals and in that case B(f)=1. In practice B(f) should preferably not be greater than 1, since otherwise 16-bit sampled microphone signals in the beamformer cannot be guaranteed to give a beamformer output that is possible to store in 16 bits sample format (without implicit scaling using Q values which anyway would saturate the beamformer output when it would be played or stored as audio files.) Note, however, that for completeness, values for B(f) that are less than 1 may be included and this may be beneficial in some cases (for example when the beamformer input signals are 24 bit and the output signals are 16 bit). Furthermore, in some embodiments B(f) may be greater than 1 and this may be beneficial in some cases (for example when the beamformer input signals are 16 bit and the output is 24 bit, and also when the desired signal in the beamformer needs to be amplified and it would be beneficial to perform the amplification in the beamformer for reasons of accuracy).

Since (in preferred embodiments) the estimate of the echo power $|\tilde{S}(t, f)|^2$ is based on the strongest of the received audio signals, the value of $B(f) |\tilde{S}(t, f)|^2$ is guaranteed to be at least as large as the actual echo power in the beamformer output $|S(t, f)|^2$. The constant beamformer gain B(f) of the beamformer 504 which is applied to the received audio signals in the principal direction of the beamformer 504 is known a priori for the beamformer 504, or can otherwise simply be estimated.

Thus the preferred embodiments of the invention provide an echo power estimate $B(f)|\tilde{S}(t, f)|^2$ (where B(f) is 1 in some preferred embodiments) that:

1. is based on a linear model and therefore can be estimated using linear echo cancellation functionality;
2. has the same time-variations as an echo canceller which is implemented without beamforming also being implemented; and
3. provides a bounded estimate of the echo power that is guaranteed not to be smaller than the echo power in the beamformer output $|S(t, f)|^2$, thereby ensuring that the echo canceller 506 does not apply too little suppression.

It can be noted that ideally it would be good to know the instantaneous echo suppression achieved by the beamformer, since this could allow for a lower amount of echo suppression to be applied by the echo canceller 506, which in turn would make the echo canceller 506 more transparent to the near-end signals. However, a microphone beamformer array typically has a limited number of microphones and the echo suppression that can be achieved by the beamformer 504 is therefore limited, so the transparency reduction caused by not taking this into account is minor.

In summary, in preferred embodiments of the present invention, the behaviour of the echo canceller 506 is based on the strongest of a plurality of received audio signals ($Y_{max}(t, f)$) prior to application of a beamformer to the received audio signals, whilst the echo canceller 506 is applied to the output of the beamformer 504.

Advantages of preferred embodiments of the present invention over the first prior art device shown in FIG. 3 are:

Computational complexity: For the first prior art device shown in FIG. 3 each microphone requires an additional echo canceller to be used, and even though some of the computations can be shared between the echo cancellers, the computational complexity is increased significantly for each microphone in the array. In contrast, the complexity increase required by preferred embodiments of the present invention is only minor since only one echo canceller (e.g. 506) is required to be implemented.

Ease of integration: For the first prior art device shown in FIG. 3 a major redesign of an existing echo canceller is needed. In contrast, in preferred embodiments of the present invention the required echo canceller modifications are minor.

Beamformer performance: For the first prior art device shown in FIG. 3 the operation of the beamformer 304 needs to be adjusted since otherwise the echo cancellers 306 applied to each of the beamformer inputs may disturb the beamforming and the adaptivity of the beamforming process. Furthermore, by introducing the echo cancellation functionality before the beamforming, the possible suppression of loudspeaker echoes achieved by the beamformer 304 cannot be used to increase the transparency of the echo cancellation. In contrast, preferred embodiments of the present invention impose no requirements on the behaviour of the beamformer 504 in order to perform the echo cancellation using the echo canceller 506. Furthermore, any available information of any echo suppression achieved by the beamformer 504 could potentially be used to increase the echo canceller transparency to the near-end signals.

Advantages of preferred embodiments of the present invention over the second prior art device shown in FIG. 4 are:

Beamformer performance: For the second prior art device shown in FIG. 4 the operation of the beamformer 404 needs to be adjusted to be varying relatively slowly, since otherwise the echo canceller 406 will find it more difficult to adjust to the changes in the behaviour of the beamformer 404. This adjustment is needed since the beamformer 404 is included in the echo path perceived by the echo canceller 406. If the echo canceller 406 is not able to properly adjust to the changes in the beamformer 404 it may happen that echoes are passed through the echo canceller 406. Furthermore, in order for this second prior art device to function correctly, the changes in the behaviour of the beamformer 404 must be performed during loudspeaker activity so that the echo canceller 406 is able to detect and adapt to the changes in the beamformer behaviour. This requirement significantly limits the performance of the beamformer 404. In contrast, preferred embodiments of the present invention impose no requirements on the behaviour of the beamformer 504 in order for the echo canceller 506 to perform the echo cancellation. Therefore, preferred embodiments of the present invention do not limit the behaviour of the beamformer 504, as in the second prior art device.

Beamformer generality: The beamforming function $f(\,)$ of the beamformer 404 of the second prior art device shown in FIG. 4 must be linear if the echo canceller 406 is to use a linear model for the echo cancellation. In contrast, in preferred embodiments of the invention, the beamforming function $f(\,)$ of the beamformer 504 is not required to be linear. Indeed, in embodiments of the invention, the beamforming function $f(\,)$ of the beamformer 504 may be linear or non linear.

In the example embodiments described above the microphone array 106 is a 1-D array of microphones (302$_1$, 302$_2$ and 302$_3$) which allows the beamformer 504 to distinguish between audio signals received with different angles in one dimension (e.g. along a horizontal axis). In alternative embodiments, the microphone array 106 may be a 2-D or a 3-D array of microphones which would allow the beamformer 504 to distinguish between audio signals received with different angles in two or three dimensions respectively (e.g. along horizontal, vertical and depth axes). Furthermore, in the preferred embodiments the microphone array 106 is a uniform array of microphones 302. However, in alternative embodiments the microphone array 106 may be a non-uniform array of microphones 302.

As described above, the beamformer 504, the echo canceller 506 and the processing block 508 may be implemented in software executed on the CPU 104 or implemented in hardware in the device 102. When the beamformer 504, the echo canceller 506 and the processing block 508 are implemented in software, they may be provided by way of a computer program product embodied on a non-transient computer-readable medium which is configured so as when executed on the CPU 104 of the device 102 to perform the function of the beamformer 504, the echo canceller 506 and the processing block 508 as described above. The method steps S604 to S614 may be performed by functional blocks of the beamformer 504, the echo canceller 506 and the processing block 508 (as software or hardware blocks).

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

The device 102 may be a television or a computer or any other suitable device for implementing the invention. Furthermore, the beamformer 504, the echo canceller 506 and the processing block 508 may be enabled for any suitable equipment using stereo microphone pickup. The methods described above may be enabled as a part of a Voice Quality Enhancement (VQE) module within a device, and run on any suitable platform.

In the embodiments described above, the loudspeaker 210 is a monophonic loudspeaker for outputting monophonic audio signals and the beamformer output from the beamformer 504 is a single signal. However, this is only in order to simplify the presentation and the invention is not limited to be used only for such systems. In other words, some embodiments of the invention may use stereophonic loudspeakers for outputting stereophonic audio signals, and some embodiments of the invention may use beamformers which output multiple signals.

The invention is particularly useful for application to echo cancellers based on echo suppression since it requires only one echo canceller to be used (such as echo canceller 506 described above), and since the beamformer integration into the echo canceller is then very simple For Hybrid echo cancellers which use both subtraction-based echo cancellation (which may be linear or nonlinear) and echo suppression the situation is a bit different. The echo subtraction part of a hybrid echo canceller needs to be applied to each of the beamformer microphone input signals (in a similar manner as is done in the first prior art device shown in FIG. 3). Similarly to with the first prior art device shown in FIG. 3 drawbacks with this are that the computational complexity will be higher because of the requirement to implement multiple echo subtraction modules and because substantial integration is needed to incorporate the beamformer in an echo canceller solution. But in contrast to the first prior art device shown in FIG. 3, the performance of the beamformer 504 will not be significantly adversely affected by the echo cancellation since the echo-subtraction performed prior to the beamforming will mainly affect the echo in the received audio signals and will not significantly affect the other received audio signals. The echo suppression part of the echo canceller is still performed after the beamformer when hybrid echo cancellation is implemented according to the invention.

Although in the embodiments described above the processing block 508 is shown as being separate to the beamformer 504 and the echo canceller 506, in some embodiments some or all of the functionality of the processing block 508 may be implemented within the beamformer 504 and/or the echo canceller 506.

As described above, in the preferred embodiments the echo path estimate is based on the strongest of the received audio signals. However, in alternative embodiments the echo path estimate may be based on a different one (or more) of the received audio signals. One way to do this is by adding a user parameter, stating that the power of the selected audio signal on which to base the echo path estimate must not be more than x dB below the power of the strongest audio signal. Any of the received audio signals satisfying this condition may be selected for use in estimating the echo path. The value of x may be fixed, or may be variable. The user may be able to vary the value of x. Alternatively or additionally the device 102 may be able to vary the value of x.

Another way to select an audio signal other than the strongest audio signal would be to supply a previously known maximum distance between any elements in the microphone array 106, which can be used to compute the maximum difference in power between the audio signals received at the different microphones 302 of the microphone array 106. This maximum difference could then be used to bound the power of any microphone signal to the microphone signal with the maximum power. Therefore, knowledge of the power of any of the microphone signals can provide an upper bound for the power of the strongest audio signal because it is known that the difference between the power of the strongest signal and any other one of the signals is bounded to be less than a particular amount.

It is described above that the requirements for optimum operation of an echo canceller include the echo path varying slowly and the echo path being linear such that it can be modelled by a linear model. Further to this we note that echo cancellers should, and can, handle all kinds of echoes that could originate in the environment 200. The term "handle" here meaning that the echo canceller can remove all perceptible echoes from the signals received by the microphones. Furthermore, the echo canceller should also as far as possible preserve any near-end sounds. The trade-off between these partly conflicting requirements is subjective, and there are no clear rules for it.

The echo removal is performed by estimating the echo samples (in echo subtraction) and/or the echo power (in echo suppression). The more accurate these estimates are, the lower the impact by the echo cancellation on any near-end sounds will be. The accuracy of the echo sample/power estimation is based on the accuracy of the model of the echo path. If the echo path can be considered to be linear it will be more accurately estimated than if it is nonlinear. If the echo path is varying very rapidly, it will also be estimated less accurately than if it varies very slowly.

Having a nonlinear beamformer in the echo path (e.g. in the second prior art device shown in FIG. 4) will require a model for its nonlinearity. Even though it could be possible to come up with such a model, it would probably be crude, and it would be tailor-made for a specific beamformer. Therefore the presence of the beamformer 404 would anyway have a negative impact on the ability of the echo canceller 406 to preserve the near-end but, if designed properly, no impact on the ability to remove echoes.

Echo cancellers may actually include functionality to model nonlinearities caused by loudspeakers so it is fully possible to perform echo cancellation in the presence of nonlinearities in the echo path, but the achievable echo cancellation performance in terms of near-end transparency is typically reduced, depending on the accuracy of the nonlinear model.

Similarly, having a beamformer in the echo path (e.g. in the second prior art device shown in FIG. 4) that rapidly varies the echo paths, will result in a less accurate estimate of the echo path gain/echo sample estimates. Therefore it will have a negative impact on the echo canceller ability to preserve near-end sounds. The echo canceller ability to remove echoes should, however, be unaffected since the echo canceller could be designed to handle those variations.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of processing audio signals at a device, the device comprising an audio output for outputting audio signals, the method comprising:
receiving audio signals at a plurality of microphones of the device;
measuring a characteristic of at least one of the audio signals received by the plurality of microphones;
a beamforrner applying beamformer coefficients to the received audio signals, thereby generating a beamformer output; and
applying an echo canceller to the beamforrner output, thereby suppressing, from the beamformer output, an echo resulting from audio signals output from the audio output,
wherein an operating parameter of the echo canceller is controlled based on the measured characteristic of the at least one of the audio signals received by the plurality of microphones,
wherein the power of said at least one of the audio signals received by the plurality of microphones is used to determine an upper bound on the power of the strongest of the received audio signals based on the distance between the plurality of microphones of the device.

2. The method of claim 1 wherein said at least one of the audio signals received by the plurality of microphones comprises the strongest of the received audio signals.

3. The method of claim 2 further comprising determining which of the received audio signals is the strongest of the received audio signals.

4. The method of claim 1 wherein said at least one of the audio signals received by the plurality of microphones is selected from those ones of the received audio signals which have a power which is not more than a predetermined amount less than the power of the strongest of the received audio signals.

5. The method of claim 4 wherein the predetermined amount is variable, and the method comprises receiving a variation of the predetermined amount.

6. The method of claim 1 wherein said measuring a characteristic of at least one of the audio signals comprises measuring an echo path gain from the at least one of the audio signals received by the plurality of microphones.

7. The method of claim 6 further comprising using said measured echo path gain to determine an estimate of the echo power in the beamformer output, wherein said operating parameter is controlled based on the estimate of the echo power in the beamformer output.

8. The method of claim 7 further comprising determining a frequency dependent beamformer gain that is applied by the beamformer to the audio signals that are received by the plurality of microphones from a principal direction of the beamformer, wherein said beamformer gain is used in said determination of the estimate of the echo power in the beamformer output.

9. The method of claim 7 wherein said determined estimate of the echo power represents an upper bound of the echo power in the beamformer output.

10. The method of claim 1 wherein said operating parameter comprises a level of echo suppression which is applied by the echo canceller to the beamformer output.

11. The method of claim 1 further comprising adapting said beamformer coefficients of the beamformer based on an analysis of the received audio signals.

12. The method of claim 11 wherein said beamformer coefficients are adapted so as to minimise the power in the beamformer output within beamforming constraints of the beamformer.

13. The method of claim 12 wherein said beamforming constraints of the beamformer comprise a constraint that an audio signal received at the plurality of microphones in a principal direction of the beamformer is not distorted by the application of the beamformer coefficients.

14. The method of claim 1 wherein the beamformer coefficients describe either a linear function or a non-linear function of the received audio signals.

15. A device for processing audio signals, the device comprising:
an audio output for outputting audio signals;
a plurality of microphones for receiving audio signals;
a beamformer configured to apply beamformer coefficients to the received audio signals, to thereby generate a beamformer output;
an echo canceller configured to be applied to the beamformer output, to thereby suppress, from the beamformer output, an echo resulting from audio signals output from the audio output; and
a measuring component for measuring a characteristic of at least one of the audio signals received by the plurality of microphones, and for controlling an operating parameter of the echo canceller based on the measured characteristic of the at least one of the audio signals received by the plurality of microphones,
wherein the power of said at least one of the audio signals received by the plurality of microphones is used to determine an upper bound on the power of the strongest of the received audio signals based on the distance between the plurality of microphones.

16. The device of claim 15 wherein said echo canceller is arranged to apply echo suppression to the beamformer output.

17. The device of claim 16 wherein said echo canceller is further arranged to apply echo subtraction to each of the audio signals received by the plurality of microphones prior to application of the beamformer coefficients to the received audio signals by the beamformer.

18. The device of claim 15 wherein the beamformer is a Minimum Variance Distortionless Response beamformer.

19. A computer program product for processing audio signals at a device, the device comprising a plurality of microphones for receiving audio signals and audio output for outputting audio signals, the computer program product being embodied on a computer-readable device and configured so as when executed on a processor of the device to perform operations comprising:
measuring a characteristic of at least one of the audio signals received by the plurality of microphones;
using a beamformer to apply beamformer coefficients to the received audio signals, thereby generating a beamformer output; and
applying an echo canceller to the beamformer output, thereby suppressing, from the beamformer output, an echo resulting from audio signals output from the audio output, wherein an operating parameter of the echo canceller is controlled based on the measured characteristic of the at least one of the audio signals received by the plurality of microphones, wherein the power of said at least one of the audio signals received by the plurality of microphones is used to determine an upper bound on the power of the strongest of the received audio signals based on the distance between the plurality of microphones of the device.

20. A device configured to process audio signals, the device comprising:
- an audio output block configured to output audio signals;
- a plurality of microphones configured to receive audio signals;
- a beamformer configured to apply beamformer coefficients to the received audio signals, to thereby generate a beamformer output;
- an echo cancelling block configured to be applied to the beamformer output, to thereby suppress, from the beamformer output, an echo resulting from audio signals output from the audio output block; and
- a processing block configured to measure a characteristic of at least one of the audio signals received by the plurality of microphones, and for controlling an operating parameter of the echo cancelling block based on the measured characteristic of the at least one of the audio signals received by the plurality of microphones, wherein the power of said at least one of the audio signals received by the plurality of microphones is used to determine an upper bound on the power of the strongest of the received audio signals based on the distance between the plurality of microphones.

21. A method of processing audio signals at a device, the device comprising an audio output for outputting audio signals, the method comprising:
- receiving audio signals at a plurality of microphones of the device;
- measuring a characteristic of at least one of the audio signals received by the plurality of microphones by measuring an echo path gain from the at least one of the audio signals received by the plurality of microphones;
- a beamforrner applying beamformer coefficients to the received audio signals, thereby generating a beamforrner output; and
- applying an echo canceller to the beamforrner output, thereby suppressing, from the beamformer output, an echo resulting from audio signals output from the audio output, wherein an operating parameter of the echo canceller is controlled based on the measured characteristic of the at least one of the audio signals received by the plurality of microphones, and using said measured echo path gain to determine an estimate of the echo power in the beamformer output, wherein said operating parameter is controlled based on the estimate of the echo power in the beamformer output.

22. The method of claim 21 further comprising determining a frequency dependent beamformer gain that is applied by the beamformer to the audio signals that are received by the plurality of microphones from a principal direction of the beamformer, wherein said beamformer gain is used in said determination of the estimate of the echo power in the beamformer output.

23. The method of claim 22 wherein said determined estimate of the echo power represents an upper bound of the echo power in the beamformer output.

24. A method of processing audio signals at a device, the device comprising an audio output for outputting audio signals, the method comprising:
- receiving audio signals at a plurality of microphones of the device;
- measuring a characteristic of at least one of the audio signals received by the plurality of microphones;
- a beamforrner applying beamformer coefficients to the received audio signals, thereby generating a beamforrner output, said beamformer coefficients being adapted based on an analysis of the received audio signals and being adapted so as to minimise the power in the beamformer output within beamforming constraints of the beamformer; and
- applying an echo canceller to the beamforrner output, thereby suppressing, from the beamformer output, an echo resulting from audio signals output from the audio output, wherein an operating parameter of the echo canceller is controlled based on the measured characteristic of the at least one of the audio signals received by the plurality of microphones.

25. The method of claim 24 wherein said beamforming constraints of the beamformer comprise a constraint that an audio signal received at the plurality of microphones in a principal direction of the beamformer is not distorted by the application of the beamformer coefficients.

* * * * *